Dec. 15, 1942.　　　W. C. WAGNER　　　2,305,504
RECORDING DEMAND METER
Filed Sept. 2, 1939　　　3 Sheets-Sheet 1

WITNESS:

INVENTOR
Walter C. Wagner
BY
Augustus P. Stoughton
ATTORNEY.

Dec. 15, 1942.　　　　W. C. WAGNER　　　　2,305,504
RECORDING DEMAND METER
Filed Sept. 2, 1939　　　　3 Sheets-Sheet 3

WITNESS:
Rob R Kitchel

INVENTOR
Walter C. Wagner
BY
Augustus B. Stoughton
ATTORNEY.

Patented Dec. 15, 1942

2,305,504

UNITED STATES PATENT OFFICE 2,305,504

RECORDING DEMAND METER

Walter C. Wagner, Ardmore, Pa.

Application September 2, 1939, Serial No. 293,190

3 Claims. (Cl. 234—5.5)

The principal object of the present invention is to provide a demand register with comparatively simple and reliable mechanism for keeping an accurate and easily legible graphic record of the maximum demand occurring in each of successive groups of comparatively short intervals of time; for example for keeping a graphic record of the maximum demand occurring during successive billing periods, or other intervals at which the meter is read and reset; to the end that there may always be available a graphic record of the maximum demand occurring during intervals between reading and resetting of the meter, or during billing periods.

Generally stated, the invention comprises a demand meter provided with a stylus and a chart which remains at rest during movements of the stylus so that the stylus indicates by the length of its graph the maximum demand during a billing period, and with manually controlled means for shifting the chart to a new position of rest when the meter is reset at the end of a billing period, thereby preserving a record of the maximum demand in that billing period and positioning the chart for a repetition of the described operations in the subsequent billing period.

The invention also comprises the improvements to be presently described and finally claimed.

In the following description, reference will be made to the accompanying drawings forming part hereof and in which, Figure 1 is a diagrammatic and schematic view of a watt hour demand register embodying features of the invention.

Figure 1:
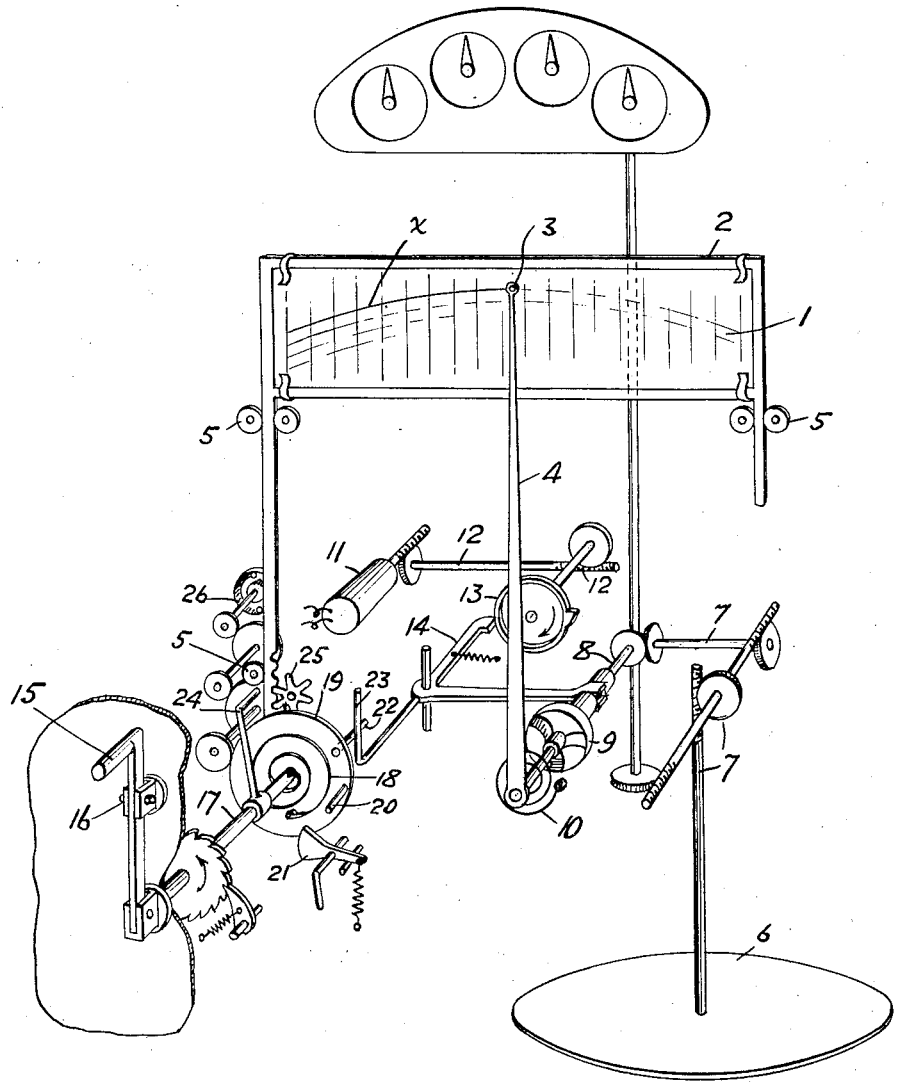

Referring to the drawings, and more particularly to Fig. 1, 1 indicates a chart and 2 indicates a chart holder. 3 indicates a stylus and it is shown as carried by the friction pointer 4 of the instrument and arranged in operative position with respect to the chart 1. There are suitable friction guides 5 in which the chart holder is guided for movement parallel to itself and as shown in vertical direction. It is well known that the pointer 4 or equivalent element moves from left to right a distance consonant with the watt hour demand during successive automatically established short intervals of time measured, for example, in minutes, and its maximum position during a repetition of such short intervals of time, for example during the billing period, indicates the maximum demand occurring during a group of successive short intervals of time. In consequence of this the length indicates the maximum demand occurring until the meter is read and reset at which time the pointer is returned to zero. This group of intervals of short length of time may correspond to the billing period. Then when the meter is reset the chart is shifted to a new position in respect to the stylus so that a similar record will be kept on the chart for the next billing period. There is, therefore, on the chart, or a number of charts, a graphic record of the maximum demand occurring during each billing period. The watt hour meter disk 6 through the means indicated at 7 drives the spindle 8. The spindle 8 through the clutch mechanism 9 drives the friction pointer 4 toward the right against the tension of the spring 10. Periodically the synchronous motor 11 through the gearing 12 turns the cam 13 causing its high part to operate on one end of the clutch lever 14 causing it to disengage the clutch 9 whereupon the spring 10 returns the pointer 4 and stylus 3 to zero position. The stylus 3 has drawn a line on the chart 1 the length of which corresponds with the maximum demand during that cycle of operation. This cycle of operation is automatically repeated at intervals of time which are comparatively short in respect to the billing period and which are measured in minutes, for example, from a few minutes to an hour. The stylus, therefore, travels back and forth in the same line $x$ on the chart increasing the length of the line $x$ as the maximum demand increases. This operation continues until the instrument is read and reset for example at the end of a billing period. Then the meter reader releases the crank 15 from its holder 16 and turns it and the shaft 17 which is ratcheted to be turned only left handed through one revolution. The effect of this is to set in operation resetting mechanism and the resetting mechanism is automatic in its action and independent of the hand or control of the operator. When the shaft 17 is turned the spring 18 of which one end is attached to the shaft 17 and the other end to the disk 19 serves to turn the disk 19 and pin 20 carried by it left-handed, and when, in that motion the pin 20 strikes the stop 21, the spring 18 is tensioned. The disk 19 is free to turn on shaft 17. When the stop 21 is disengaged from the pin 20 by the crank arm 24 on shaft 17, the spring in tension turns the disk 19 until the pin 22 on the disk collides with the arm 23 on the clutch lever so that the latter is turned to shift the clutch 9 into position for freeing the pointer 4 which by the spring 10 returns to zero. The described motion of the disk 19 brings the pin 22 into engagement with the pinion 25 which shifts the chart holder 2 upward to present a new portion of its surface to the stylus 3 and on that new surface another line similar to $x$ is drawn during the next billing period. The governor mechanism 26 controls the movement of the disk 19 when it is turned by the spring 18. Fig. 1 illustrates the condition in which crank 15 has been given a full turn and replaced in its holder while the mechanism has been wound and released and is returned to the stopped position under control of the governor.

It will be obvious that the length on the line $x$ indicates the maximum demand that has occurred during a billing period and such a record is, of course, extremely valuable.

Figure 2:
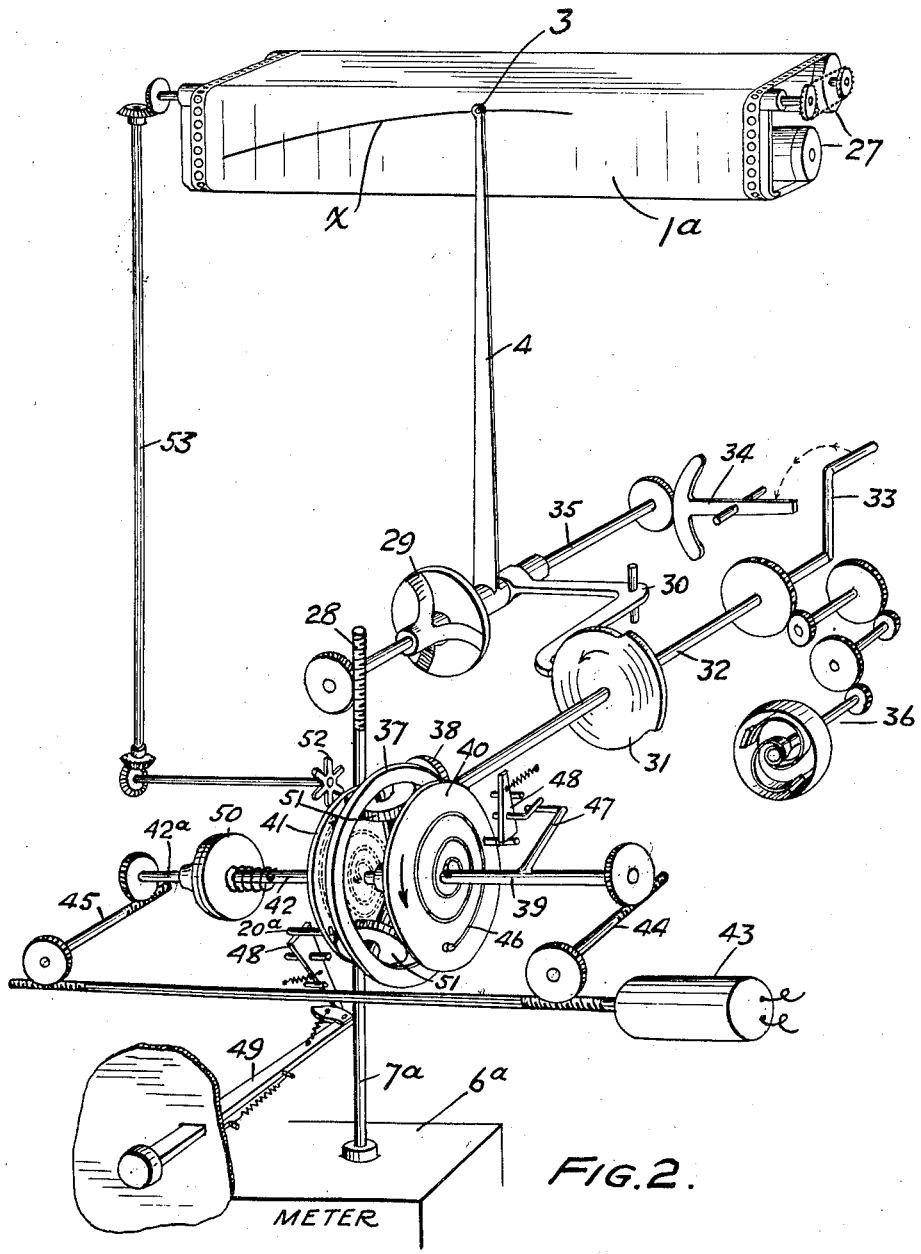
Figure 2 is a similar view also showing a modification.

As described in connection with Figure 1 the stylus rides on the surface of the chart in both its right hand and left hand movements and the load of resetting the spring 10 is imposed upon the meter. However, the load of resetting the spring 10 is not imposed upon the meter in the construction shown in Figure 2. The construction shown in Figure 2 and its operation are substantially as described in connection with Figure 1 except as follows: The chart 1a is wound upon rollers 27 and the stylus 3 draws a line $x$ on the chart 1a. The stylus and pointer 3 and 4 are moved toward the right by the spindle 7a which is the analogue of the spindle 7 in Figure 1 through the means 28 and clutch 29. In place of the watt hour meter disk 6, the integrator 6a driving spindle 7a may be a steam, gas, watt hour or kva. meter. 30 is the clutch lever and it is operated by a cam 31 on a shaft 32. On the shaft 32 is also an arm 33 which operates upon the stem of a quadrant 34 which turns the shaft 35 and serves to retain the stylus to zero position without imposing an additional load on the meter. The shaft 32 is turned by a spring means to be described and the governor mechanism 36 controls its turning movement under the force of the spring. It is evident that the shaft 32 and its connections are means which release the stylus and return it to zero position and this shaft 32 is operated by a differential mechanism having internal gears 51. The differential mechanism is actuated by motor wound springs. The element 37 of the differential mechanism is geared to the shaft 32 by the wheel 38 in a 2 to 1 ratio so that shaft 32 revolves at the same rate as shaft 39. One end of the differential mechanism is driven by the disk 40, free to turn on shaft 39, and the other end is driven by the disk 41, free to turn on shaft 42, the disks 40 and 41 have teeth which engage the internal gears 51. The shaft 39 and the shaft 42 are turned by the synchronous motor 43 through gearing 44 and 45. The springs for turning the parts 40 and 41 are duplicates and a description of one will suffice. When the shaft 39 is turned, and it is turned at stated intervals of time, the spring 46, of which one end is connected to 39 and the other to 40, is put into tension and then released by the arm 47 which releases the stop 48 so that the spring drives the shaft 32 and the stylus 3 is returned to zero. The construction and operation of the part 41 and its accessories are as above described except that their stop 48 is released by the manual operation of the push rod 49 which is actuated by the operator or meter reader at the end of the billing period. 50 is a friction clutch which when the spring of the element 41 is wound or tensioned permits the end 42a of the shaft to turn while the main portion of it is held at rest by the stop 48.

From the foregoing description it is evident that one end of the differential mechanism is operated at comparatively short intervals of time by the synchronous motor and the other end of the differential mechanism is operated at the end of a billing period by the operator and whichever way it is operated the differential mechanism through the shaft 32 and its accessories causes the stylus to be returned to zero. There is a stop pin on the disk 41 as indicated at 20a. It operates the star wheel 52 which through the mechanism or gearing 53 advances the chart 1a whenever the meter is reset by the operation of the push rod 49.

Figure 3:
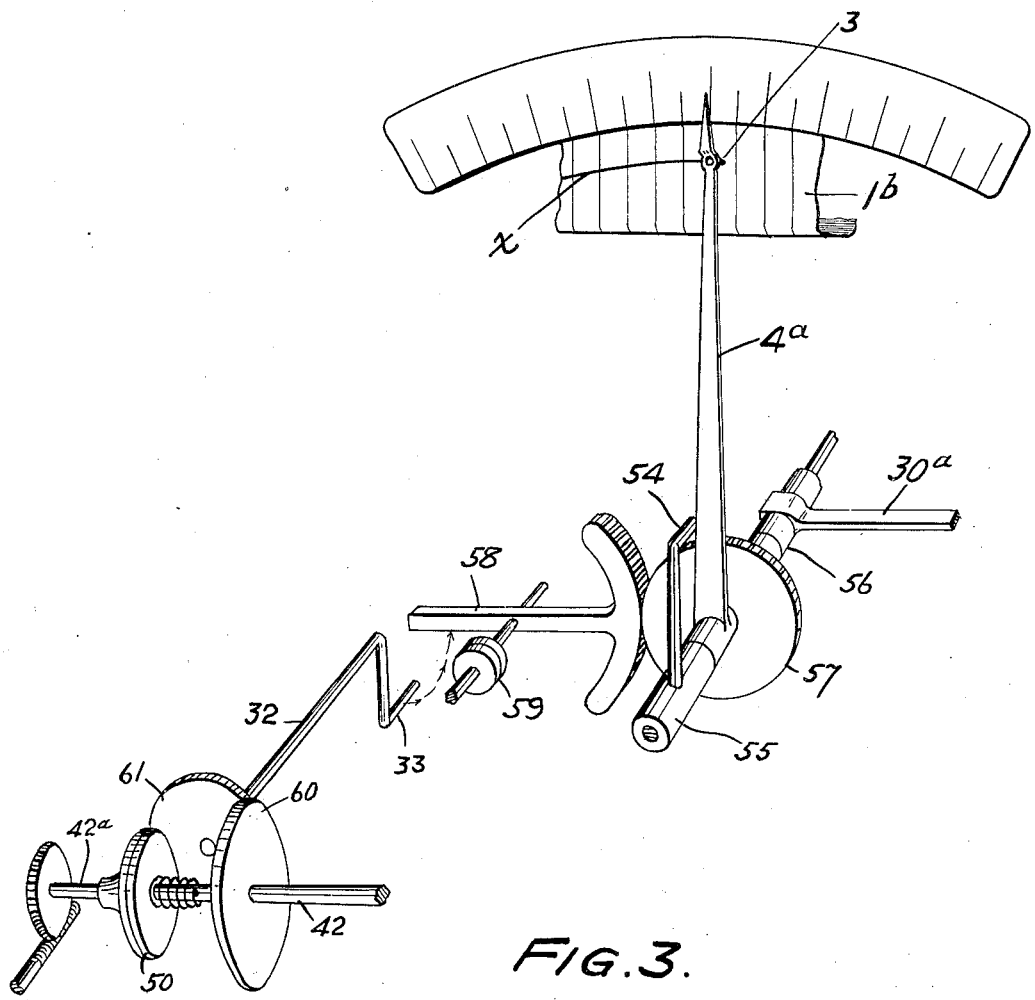
Figure 3 is a similar view illustrative of another modification.

The construction and mode of operation of the modification shown in Figure 3 are as above described except as follows: Pointer 4a is moved toward the right at recurrent intervals by a pusher 54 and is moved toward the left only when the instrument is reset. The elements 55 and 56 are interconnected so as to operate as one piece and the hub of the pointer is connected with the toothed wheel 57. It will be understood that the difference between the construction and operation of Figs. 2 and 3 resides in the fact that the pusher 54 is operated in substantially the same way and by substantially the same means as the pointer 4 is operated in the construction of Figure 2. However, in Fig. 3 the movement of the clutch lever 30a corresponding with the clutch lever 30 in Figure 2 shifts not only the clutch as it did before but it also shifts the pointer 4a toward the chart 1b so that its stylus contacts with the chart. When the meter is reset the quadrant 58 turns the toothed wheel 57 and moves the pointer 4a with its stylus in contact with the chart toward the left, drawing the line $x$ on the chart. The friction clutch 59 serves to hold pointer 4a in position against any tendency to be moved except by pusher 54 and by quadrant 58 during reset. One way of operating the quadrant 58 is to connect it with the resetting mechanism that is set in motion at the end of the billing period. The mechanism shown toward the lower left in Figure 3 indicates parts of the differential mechanism and its accessories shown in Figure 2. Shaft 32 is suitably driven from shaft 42 by gears 60 and 61. The quadrant 58 is not the quadrant 34 of Figure 2 but is an additional quadrant provided for moving the pointer toward the left and is broad enough to permit the axial movement of wheel 57 without disengaging during reset. The pusher 54 is moved toward the left by a quadrant 34 shown in Figure 2 but omitted from Figure 3 for the sake of clearness. The advantage of moving the stylus in contact with the chart only at reset of the instrument is that the surface of the chart is spared the wear of repeated movement of the stylus in contact with it.

It will be obvious that modifications may be made in details of construction and arrangement and in matters of mere form without departing from the spirit of the invention which is not limited in such matters otherwise than the prior art and the appended claims may require.

I claim:

1. In a demand meter having a stylus and means including a rotating element of the meter and disengageable connections for moving said stylus forward in a single line from the same initial position in response to the maximum demand measured by the meter during each of a plurality of intervals and along which line the maximum distance moved from initial position indicates the maximum demand which has occurred in the plurality of intervals, means for momentarily disengaging the connections at the end of each interval to permit the stylus to be returned to initial position, the combination of a chart upon which the movement of the stylus is recorded and which is immovable during said plurality of such intervals, and other means manually controlled for re-setting the stylus to initial position and for moving the chart to a position to thereby enable a new record to be made on another line on the chart.

2. In a demand meter, the combination of, a stylus mounted to advance repeatedly through the same or different distances in substantially the same path, periodic mechanism for advancing the stylus to maximum demand position occurring in a number or group of operations of said periodic mechanism, a chart operatively positioned in respect to the stylus, the chart remaining at rest, while said periodic operations occur, said mechanism so long as the chart is at rest recording said movements of the stylus in substantially a single line, the length of the line indicating the maximum demand occurring in any one of a group of such periods, and manually controlled means for resetting the stylus to zero position and immediately thereafter moving the chart from its position of rest into a new position of rest to present a fresh portion of its surface to the stylus for recording in the same manner the maximum demand occurring during the next recording of a succeeding group of short periods.

3. In a demand register for a meter, the combination of, a stylus having restoring means, said stylus mounted to be moved in a fixed path to various positions from a zero position, a rotating meter element, driving means interposed between the element and the stylus for advancing the latter toward maximum demand position and including a clutch for connecting and disconnecting the element, means periodically disengaging the clutch to permit said stylus to return to zero position after having reached maximum demand position occurring in said period, and thereafter reengaging the clutch, a chart operatively positioned in respect to the stylus, the chart remaining at rest while a succession of said periodic operations occurs, and manually controlled means for resetting the stylus to zero position and immediately thereafter moving the chart into a new position to present a fresh portion of its surface in the path of said stylus whereby to record the maximum demand occurring during the next succession of such periodic operations.

WALTER C. WAGNER.